(12) United States Patent
Komatsu

(10) Patent No.: US 9,365,179 B2
(45) Date of Patent: Jun. 14, 2016

(54) LOWER LIMB PROTECTING AIR BAG

(71) Applicant: TOYODA GOSEI CO., LTD., Kiyosu-shi, Aichi-ken (JP)

(72) Inventor: Takanori Komatsu, Kiyosu (JP)

(73) Assignee: TOYODA GOSEI CO., LTD., Aichi-pref. (JP)

( * ) Notice: Subject to any disclaimer, the term of this patent is extended or adjusted under 35 U.S.C. 154(b) by 0 days.

(21) Appl. No.: 14/833,459

(22) Filed: Aug. 24, 2015

(65) Prior Publication Data
US 2016/0052479 A1    Feb. 25, 2016

(30) Foreign Application Priority Data

Aug. 25, 2014  (JP) ................................ 2014-171015

(51) Int. Cl.
*B60R 21/206* (2011.01)
*B60R 21/231* (2011.01)
*B60R 21/261* (2011.01)

(52) U.S. Cl.
CPC ............. *B60R 21/231* (2013.01); *B60R 21/206* (2013.01); *B60R 21/261* (2013.01); *B60R 2021/23169* (2013.01)

(58) Field of Classification Search
CPC ................ B60R 21/231; B60R 21/206; B60R 2021/23169
See application file for complete search history.

(56) References Cited

U.S. PATENT DOCUMENTS

| | | | |
|---|---|---|---|
| 8,408,589 B2* | 4/2013 | Fukawatase | B60R 21/206 280/728.3 |
| 2003/0116945 A1* | 6/2003 | Abe | B60R 21/231 280/729 |
| 2011/0175334 A1* | 7/2011 | Miller | B60R 21/206 280/730.2 |
| 2012/0205898 A1* | 8/2012 | Picard | B60R 21/2338 280/730.1 |

FOREIGN PATENT DOCUMENTS

JP    2004-168280 A    6/2004

* cited by examiner

*Primary Examiner* — Faye M Fleming
(74) *Attorney, Agent, or Firm* — Posz Law Group, PLC

(57) ABSTRACT

A lower limb protecting air bag, folded stored in front of an occupant seated in a seat and inflatable to cover the front of the lower limbs of the occupant by inflation gas supplied therein, includes: a main body inflation part configured to cover the front of the lower limbs of the occupant when inflation is completed; and a shin protection part arranged at least on one end side of the main body inflation part in the horizontal direction and projectable backward from the main body inflation part for covering the lateral side of the shins of the occupant in the inflation completed time, wherein the shin protection part completes inflation with an internal pressure higher than that of the main body inflation part.

2 Claims, 15 Drawing Sheets

A.

B.

A-A PORTION ENLARGED SECTION

LOWER LIMB PROTECTING AIR BAG

CROSS-REFERENCE TO RELATED APPLICATION(S)

This application is based upon and claims the benefit of priority from Japanese Patent Application No. 2014-171015, filed on Aug. 25, 2014, the entire contents of which are incorporated herein by reference.

BACKGROUND

1. Field of the Invention The invention relates to a lower limb protecting air bag which is folded and stored in front of an occupant seated in a seat and, when inflation gas is supplied therein, is inflated to cover the front side of the lower limbs of the occupant.

2. Description of the Related Art

Conventionally, there is known a lower limb protecting air bag which includes a main body inflation part, when the inflation of the air bag is completed, for covering the front side of the lower limbs of an occupant, and a shin protection part, in the inflation completed time, projected from the main body inflation part backwardly downward for covering the lateral sides of the lower areas of the shins of the occupant. In this conventional lower limb protecting air bag, the shin protection part is formed continuously and integrally with the main body inflation part (see, for example, JP-A-2004-168280).

However, in the conventional lower limb protecting air bag, since the shin protection part is disposed such that it projects partially from the lower end side of the main body inflation part to cover the right and left sides of the lower area of the shins of the occupant, it is hard to inflate with large thickness by increasing its volume. Therefore, in a vehicle collision such as oblique collision and off-set collision, when an occupant seated in a seat moves obliquely forward, there is room for improvement in exactly receiving the shins of the obliquely forward moving occupant by the shin protection part.

SUMMARY

The invention aims at solving the above problem and thus it is an object of the invention to provide a lower limb protecting air bag capable of exactly protecting the shins of an occupant moving obliquely forward.

According to an aspect of the invention, there is provided a lower limb protecting air bag, folded stored in front of an occupant seated in a seat and inflatable to cover the front of the lower limbs of the occupant by inflation gas supplied therein, including: a main body inflation part configured to cover the front of the lower limbs of the occupant when inflation is completed; and a shin protection part arranged at least on one end side of the main body inflation part in the horizontal direction and projectable backward from the main body inflation part for covering the lateral side of the shins of the occupant in the inflation completed time, wherein the shin protection part completes inflation with an internal pressure higher than that of the main body inflation part.

In the lower limb protecting air bag of the invention, in the inflation completed time, the shin protection part projectable backward from the main body inflation part for covering the lateral sides of the shins of the occupant is structured to complete its inflation with an internal pressure higher than that of the main body inflation part, whereby, when it receives the shins of an obliquely forward moving occupant, it can receive the shins with a proper stiffness. Therefore, when it receives the shins of the occupant, it can receive the shins in such a manner that the projecting tip end side of the main body inflation part is prevented from bending outward in the horizontal direction, thereby preventing the obliquely forward moving shins from slipping through it. Thus, the shins can be exactly received by the shin protection part.

Thus, in the lower limb protecting air bag of the invention, the shins of the obliquely forward moving occupant can be protected exactly.

Specifically, in the lower limb protecting air bag of the invention, preferably, the shin protection part may be structured to communicate with the main body inflation part and let the inflation gas flow therein through the main body inflation part and, in a communication part enabling communication between the shin protection part and main body inflation part, there may be provided a check valve to prevent the inflation gas supplied into the shin protection part from flowing out toward the main body inflation part.

When the lower limb protecting air bag is structured in this manner, even when the inflation gas is supplied into the shin protection part through the main body inflation part, the inflation gas once supplied into the shin protection part can be prevented from returning into the main body inflation part, whereby the high internal pressure state of the shin protection part in the inflation completed time can be positively maintained.

BRIEF DESCRIPTION OF THE DRAWINGS

The present invention will become more fully understood from the detailed description given hereinbelow and the accompanying drawing which is given by way of illustration only, and thus is not limitative of the present invention and wherein.

DETAILED DESCRIPTION OF THE INVENTION

Figure 1:
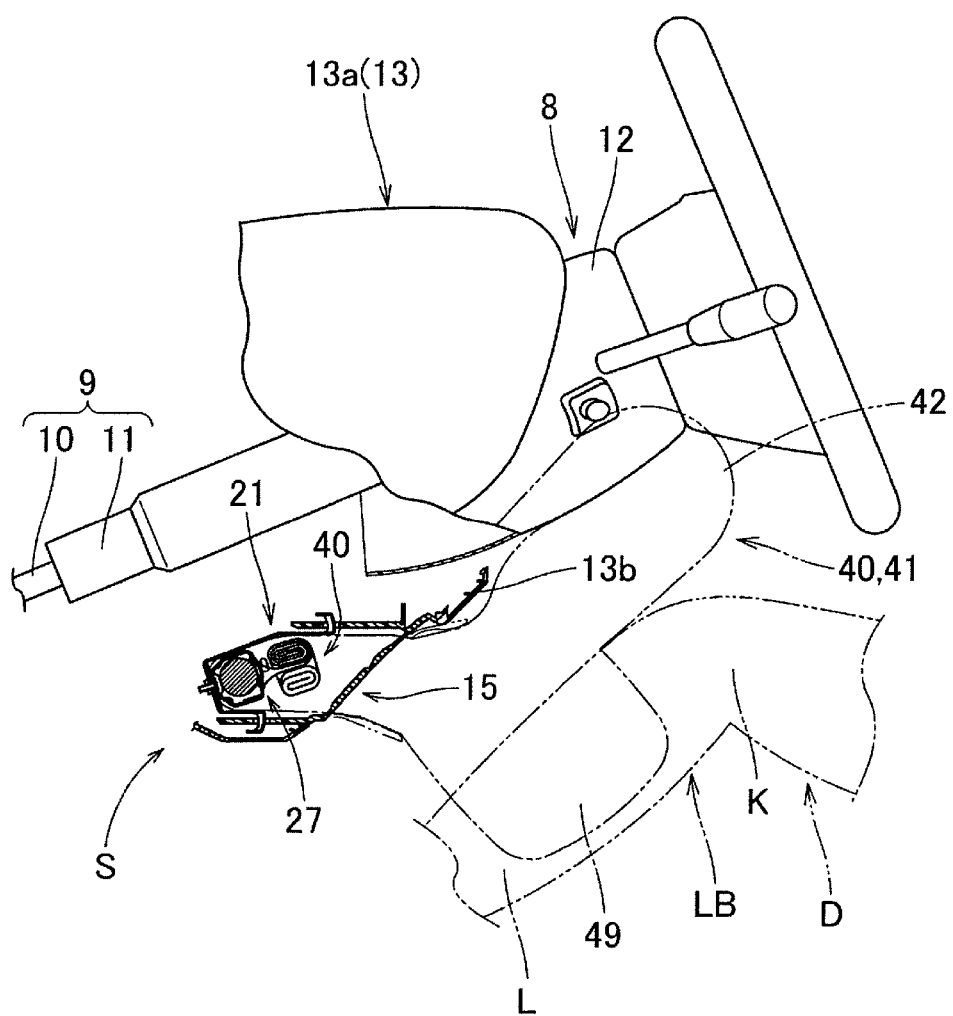
FIG. 1 is a schematic longitudinal section view of a lower limb protecting air bag apparatus using an air bag according to an embodiment of the invention, showing a state where the apparatus is mounted on a vehicle.
Figure 4:
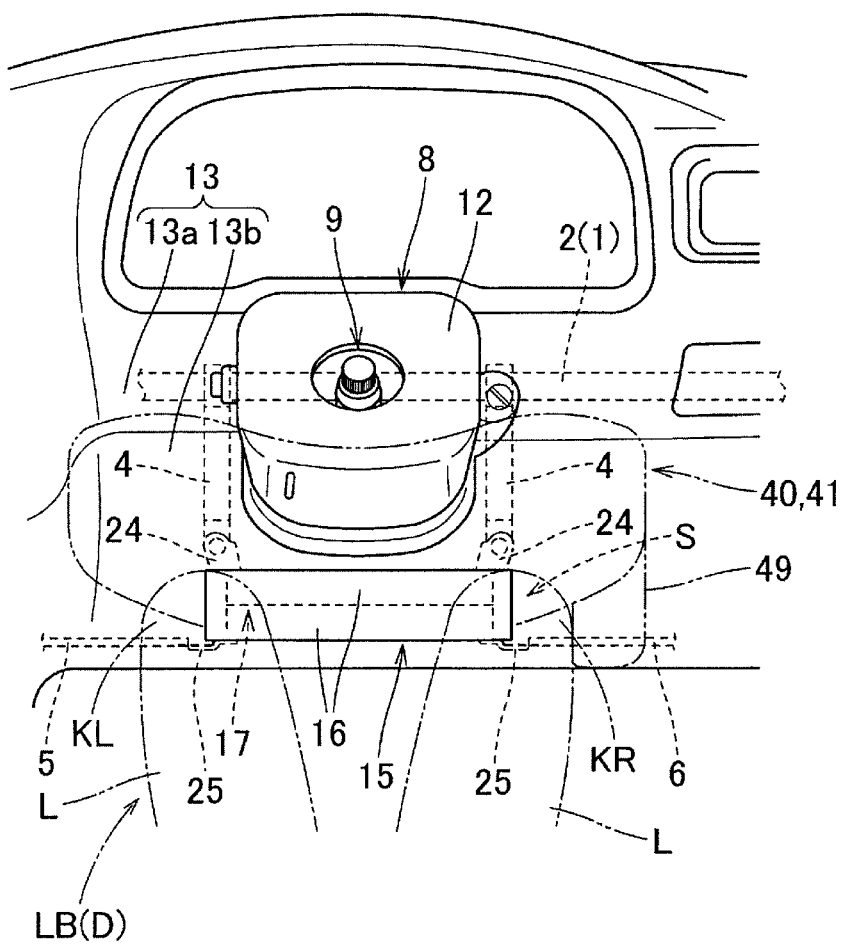
FIG. 4 is a schematic front view of the low limb protecting air bag apparatus of the embodiment, when viewed from behind the vehicle.

Description is given below of an embodiment of the invention with reference to the drawings. In this embodiment, as shown in FIGS. 1 and 4, description is given of, as an example, a lower limb protecting air bag (which is hereinafter called an air bag simply) 40 used in a lower limb protecting air bag apparatus (which is hereinafter called an air bag apparatus simply) disposed below a steering column 8 constituting the vehicle forward side of a driver D seated in a driver seat. Here, in this specification, vertical, horizontal and longitudinal directions correspond to, unless otherwise mentioned, the vertical, horizontal and longitudinal directions of the air bag apparatus S when mounted on a vehicle.

The steering column 8, as shown in FIGS. 1 and 4, includes a column main body 9 and a column cover 12 for covering the outer peripheral side of the column main body 9. The column main body 9, as shown in FIG. 1, is constituted of a main shaft 10 and a column tube 11 for covering the periphery of the main shaft 10.

The air bag apparatus S, as shown in FIGS. 1 to 4, includes a folded air bag 40, an inflator 27 for supplying expansion gas to the air bag 40, a case 21 capable of storing the folded air bag 40 and inflator 27 and having an opened vehicle backward side, and an air bag cover 15 for covering the vehicle backward side of the opening 21a of the case 21.

Figure 2:
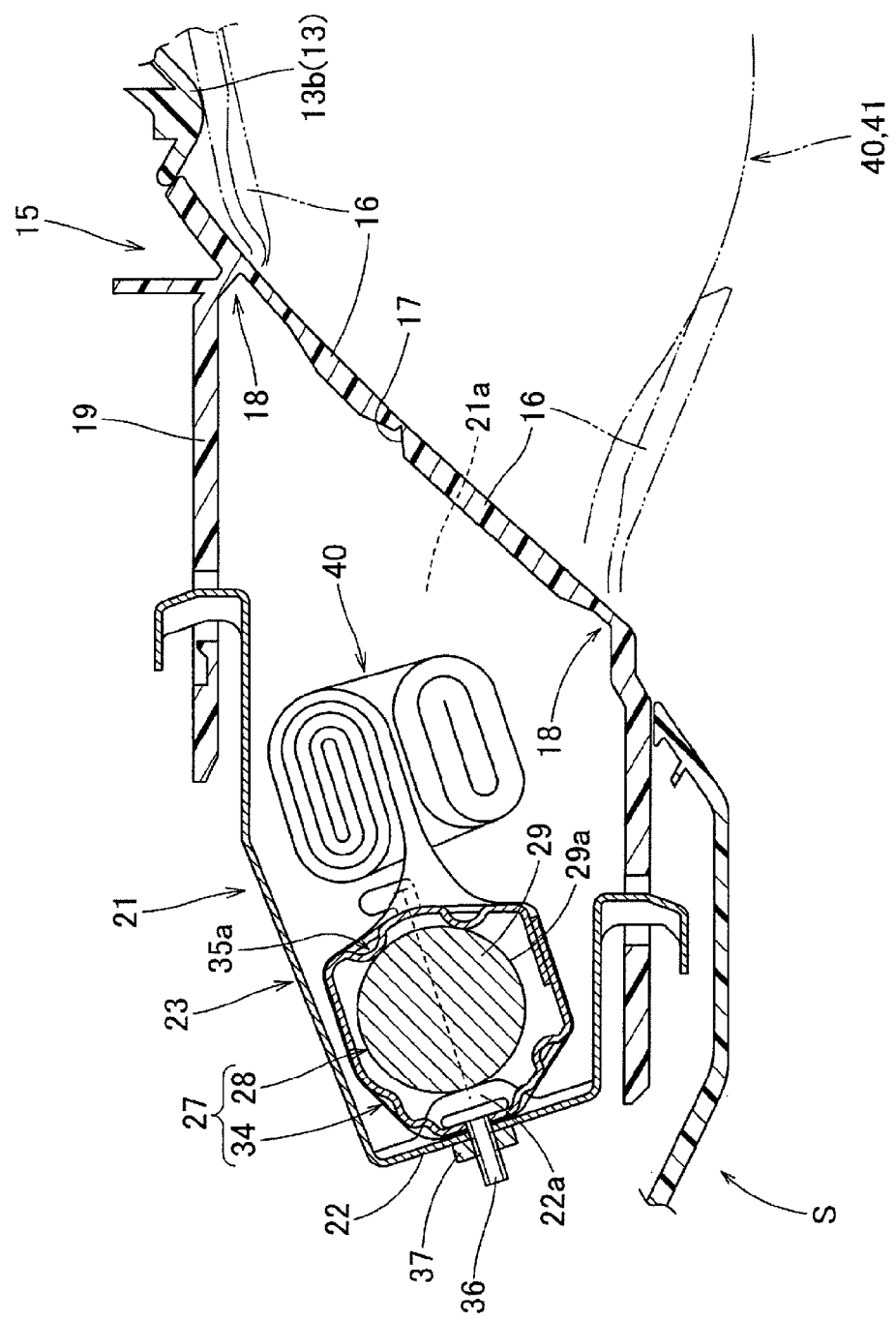
FIG. 2 is a schematic enlarged longitudinal section view of the lower limb protecting air bag apparatus of the embodiment.

The air bag cover 15 is made of polyolefin-based thermoplastic elastomer and is capable of covering the opening 21a on the vehicle backward side of the case 21. This air bag cover 15, as shown in FIGS. 1 to 4, is disposed on the lower panel 13b side of an instrument panel 13 including an upper panel 13a and a lower panel 13b. In this embodiment, it includes a door part 16 disposed so as to cover the opening 21a of the case 21 and a connecting wall part 19 extending forward from the periphery of the door part 16 to be connected to the peripheral wall part 23 of the case 21. The door part 16, as shown in FIGS. 2 and 4, includes in its periphery a breakage expected thin portion 17 having a substantially H-like shape when viewed from the vehicle backward side, and hinge portions 18 disposed on both upper and lower sides and serving as the opening centers of the door part when it is opened, while the door part 16 is opened on both upper and lower sides when it is opened.

Figure 3:
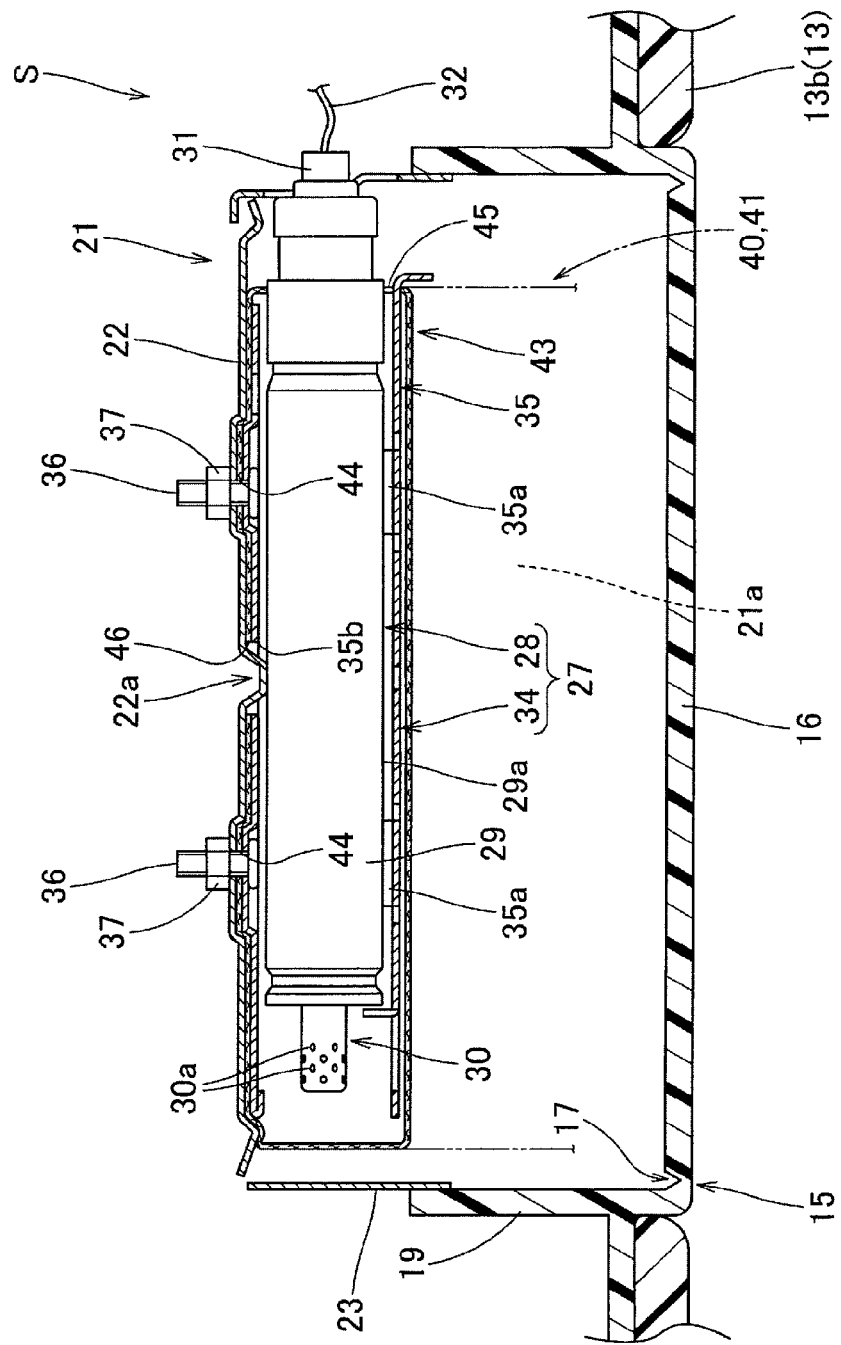
FIG. 3 is a schematic enlarged transverse section view of the lower limb protecting air bag apparatus of the embodiment.

The case 21 is made of sheet metal and, as shown in FIGS. 2 and 3, includes a substantially square-shaped bottom wall part 22 disposed on the vehicle forward side and a substantially square-shaped peripheral wall part 23 extending backward from the peripheral edge of the bottom wall part 22, while the vehicle backward side thereof is opened. The bottom wall part 22 includes: insertion holes (not shown) through which bolts 36 to be provided in the retainer 34 (which are described later) of the inflator 27 can be projected; and, a projection 22a projected backwardly to be contactable with the outer peripheral surface 29a of the main body part 29 (which is described later) of the inflator 27. Also, the peripheral wall part 23 includes mounting brackets 24, 25 for mounting the case 21 onto the body 1 side of the vehicle. The upper mounting bracket 24, as shown in FIG. 4, is connected to brackets 4, 4 extending from the body 1 side instrument panel reinforcement 2, whereas the lower mounting bracket 25 is connected to brackets 5, 6 extending from a center brace and a front body pillar (both of which are not shown) provided on the body 1 side.

The inflator 27, as shown in FIGS. 2 and 3, includes an inflator main body 28 having a substantially cylindrical outer shape and a retainer 34 for holding the inflator main body 28.

The inflator main body 28, as shown in FIG. 3, includes a large-diameter main body part 29 having a substantially cylindrical shape with its axial direction extending substantially along the horizontal direction, and a small-diameter part 30 projected from the horizontal- direction one end side (in this embodiment, the left end side) of the main body part 29. The small-diameter part 30 is smaller in diameter than the main body part 29 and includes a large number of gas discharge ports 30a capable of discharging inflation gas G. To the other end side (right end side) of the main body part 29, there is connected a connector 31 with a lead wire 32 for operation signal input connected thereto. The inflator main body 28, in this embodiment, is structured such that it can be operated in the front collision, oblique collision and off-set collision of the vehicle.

The retainer 34, as shown in FIGS. 2 and 3, includes a substantially cylindrical hold part 35 for covering the outer periphery of the inflator main body 28 and two bolts 36, 36 projected substantially orthogonally to the axial direction of the hold part 35.

The hold part 35 is made of sheet metal and has a substantially cylindrical shape with its axial direction extending substantially along the horizontal direction. It includes, in the portion disposed on the backward side of the inflator main body 28, as shown in FIG. 2, a contact portion 35a contactable with the outer peripheral surface 29a of the main body part 29 of the inflator main body 28 when mounted on the vehicle. The contact portion 35a, as shown in FIG. 3, is formed in two positions opposed to the bolts 36 on the longitudinal direction side. In the position of the hold part 35 existing forward of the inflator main body 28 when mounted on the vehicle and intervening between the bolts 36, there is formed a penetration hole 35b for insertion of a projection 22a of the bottom wall part 22 of the case 21 (see FIG. 3).

In the air bag apparatus S of the embodiment, when the inflator main body 28 is stored into the hold part 35 of the retainer 34 disposed within the folded air bag 40 and the folded air bag 40 is stored into the case 21, the bolts 36 of the retainer 34 are projected from the bottom wall part 22 of the case 21 and the nuts 37 are fastened to the bolts 36, thereby mounting the inflator 27 and air bag 40 onto the case 21. Specifically, the inflator main body 28, in the nut 37 fastening time, is held between the projection 22a of the bottom wall part 22 of the case 21 and the contact portions 35a of the hold part 35 of the retainer 34, whereby it is retained by the retainer 34.

Figure 5:
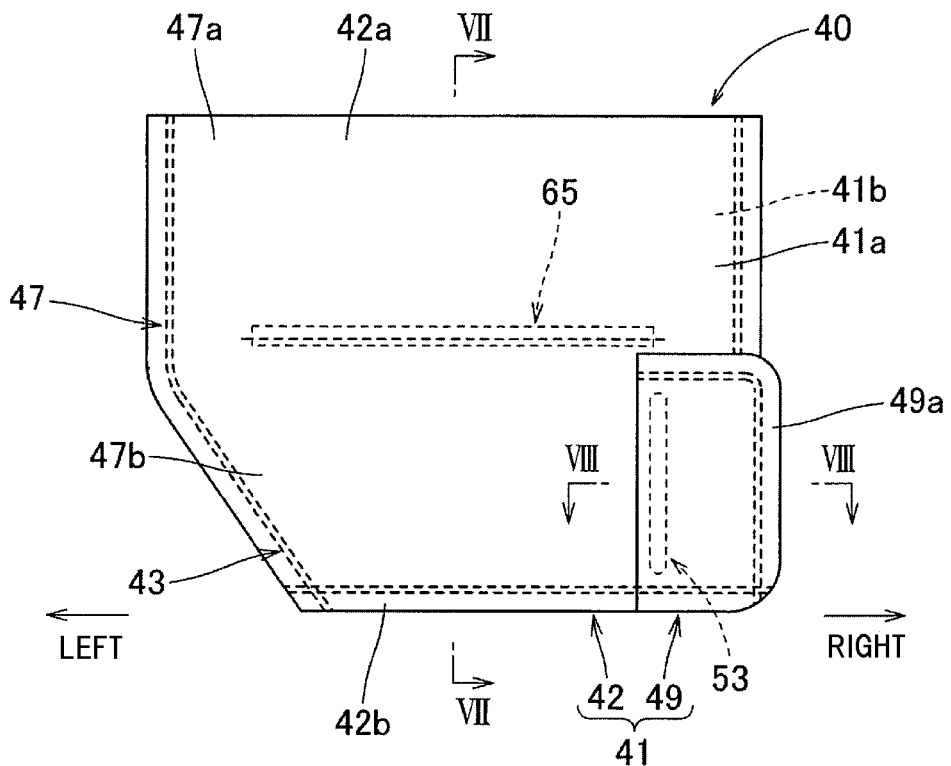
FIG. 5 is a bottom view of the air bag of the embodiment.

The air bag 40, as shown in FIG. 5, in this embodiment, includes a bag main body 41 inflatable by inflation gas supplied therein, and an internal tether 65 disposed within the bag main body 41.

Figure 6:
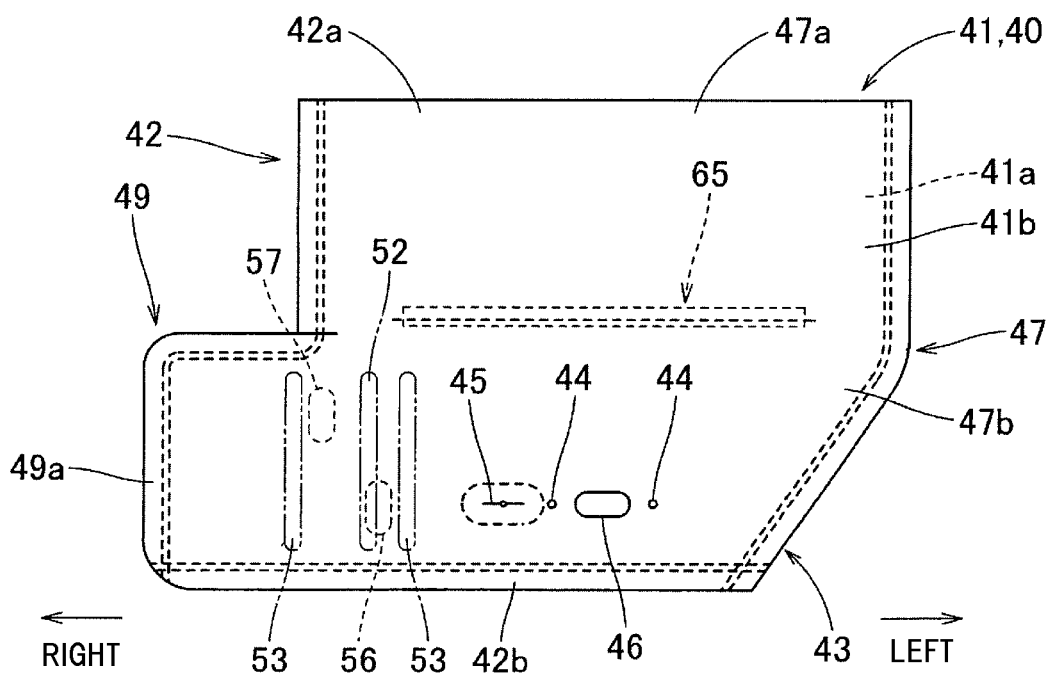
FIG. 6 is a plan view of the air bag of FIG. 5, showing a state where it is developed flat before a connecting portion is formed.
Figure 9:
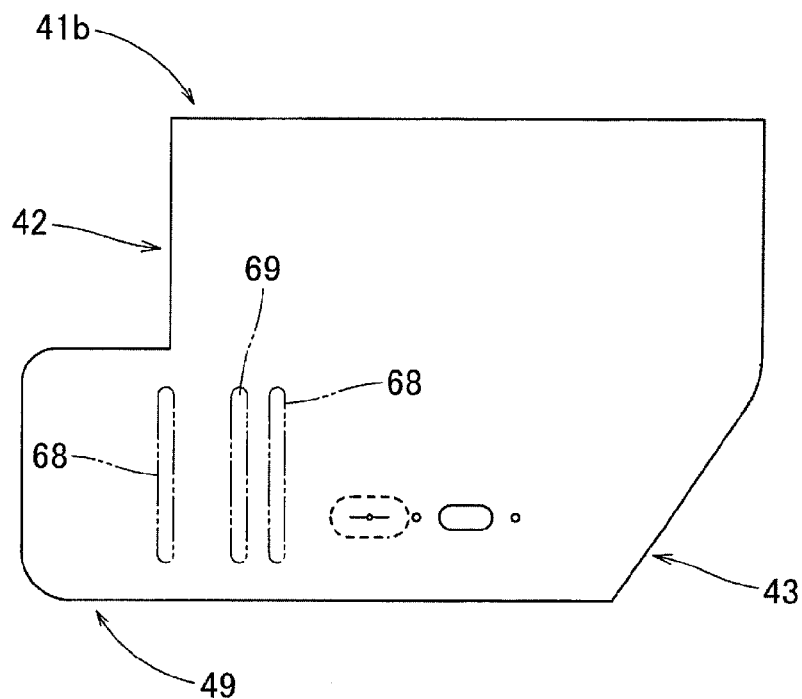
FIG. 9 is a plan view of the air bag of FIG. 5, showing a state where its front and rear side wall portions are developed flat.
Figure 9:
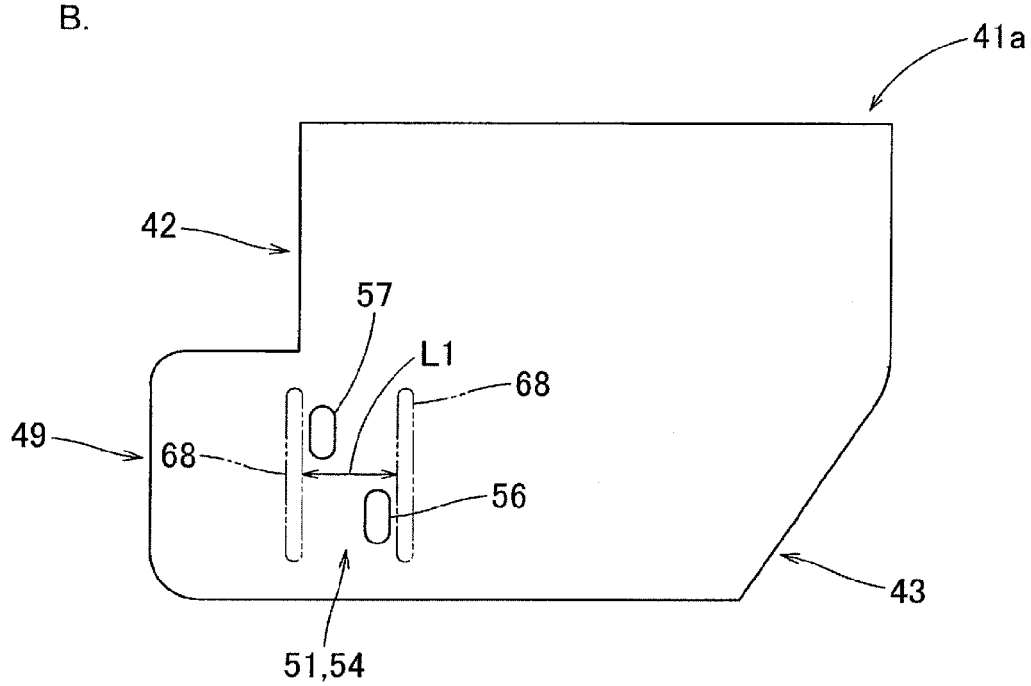
Figure 14:
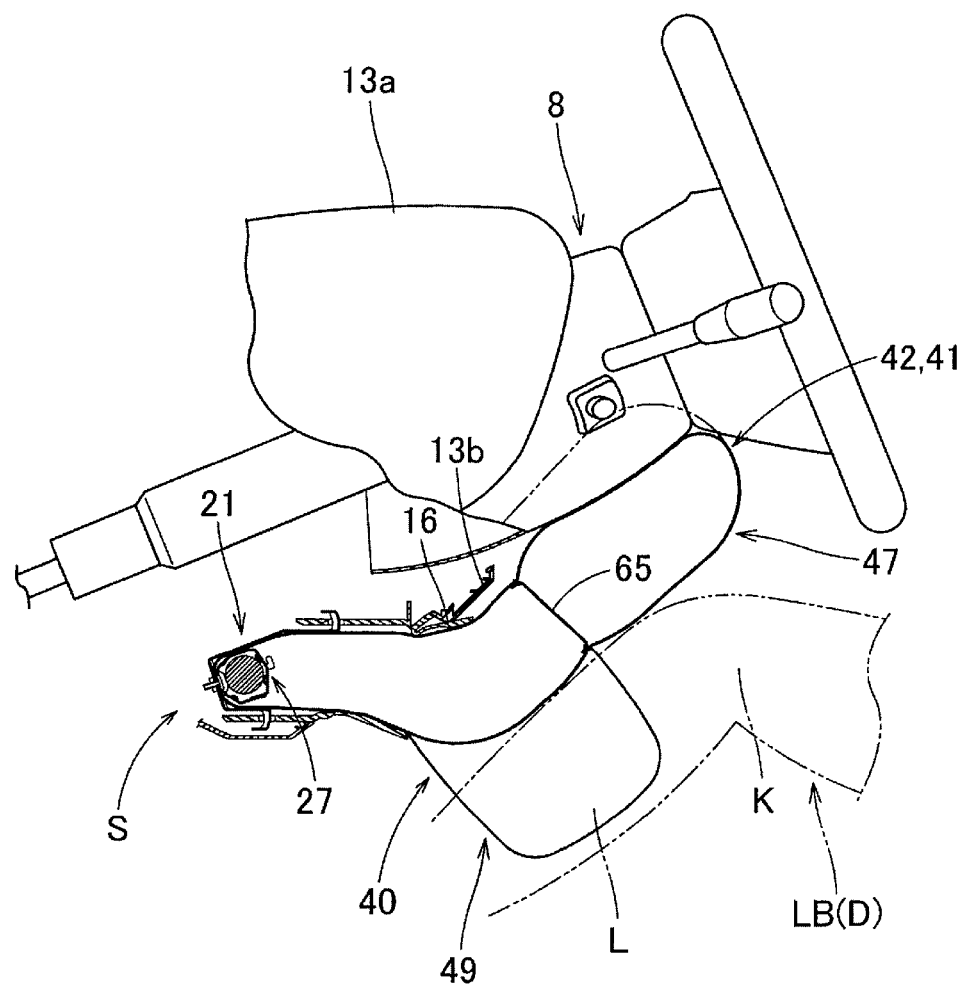
FIG. 14 is a schematic longitudinal section view of a low limb protecting air bag apparatus using an air bag according to the embodiment, showing a state where the air bag has completed inflation.
Figure 15:
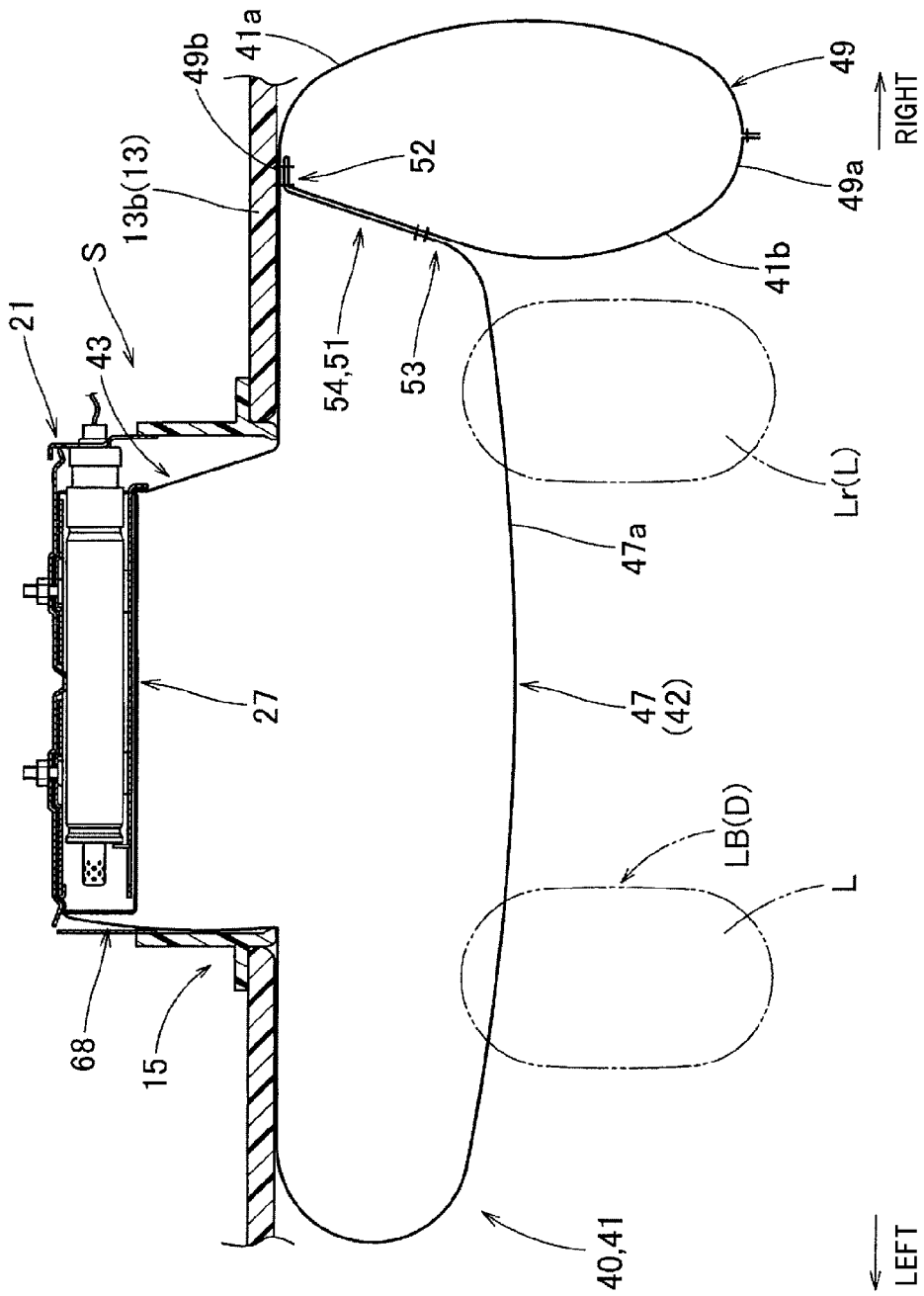
FIG. 15 is a schematic transverse section view of a lower limb protecting air bag apparatus using an air bag according to the embodiment, showing a state where the air bag has completed inflation.

The bag main body 41, as shown by two-dot lines in FIGS. 1 and 4 and as shown in FIGS. 14 and 15, when its inflation is completed, is disposed to cover the front of the lower limbs of the driver D seated in the driver seat, has a substantially rectangular shape in the inflation completed time, and is capable of protecting the driver D from the right and left shins L to the knees K (KL, KR). In the bag main body 41, as shown in FIGS. 6 and 9, the peripheral edges of a back wall portion 41b disposed on the steering column 8 side in the inflation completed time and a front wall portion 41a disposed on the driver D side the in inflation completed time respectively having substantially the same outer shape are connected to each other, thereby forming a bag-like shape. The bag main body 41, in this embodiment, includes a main body inflation part 42 for covering the front of the lower limbs LB of the driver D in the inflation completed time, and a shin protection part 49 disposed on the outer end side (in this embodiment, on the right side) of the main body inflation part 42 in the horizontal direction for covering the lateral side (right side) of the shins L (right shin Lr) in the inflation completed time.

The lower end 42b side of the main body inflation part 42 in the inflation completed time constitutes a mounting part 43 to be mounted on the case 21 so as to narrow the width of the mounting part 43 portion, while the upper end 42a side portion thereof to be disposed upwardly of the mounting part 43 in the inflation completed time constitutes a lower limb protection part 47 capable of protecting the driver D from the shins L to knees K. The lower limb protection part 47, in order to cover the front of the driver D from the knees K to shins L in the bag main body 41 inflation completed time, is interposed between the lower panel 13b or steering column 8 and the knees K or shins L. The horizontal-direction width dimension of the lower limb protection part 47 increases toward the upper end 47a, while the horizontal-direction width dimension of the upper end 47a side portion for protecting the knees K is set for a width dimension capable of covering the front of the left and right knees K (KL, KR) of the driver D (see two-dot chain lines shown in FIG. 4). In the upper surface side portion (the portion of the back wall portion 41b) of the mounting part 43, as shown in FIG. 6, there are formed two insertion holes 44, 44 enabling projection of the bolts 36 of the retainer 34, an open slit 45 enabling internal insertion of the inflator 27 (inflator main body 28 and retainer 34), and an insertion hole 46 capable of insertion of the projection 22a of the bottom wall 22 of the case 21. The open slit 45 is formed such that, with the bag main body 41 developed flat, it provides a straight shape extending substantially along the horizontal direction. The insertion hole 46 is formed between the insertion holes 44.

The shin protection part 49, in this embodiment, is formed to project backward on the right end side of the main body inflation part 42 in the inflation completed time, thereby covering the horizontally outside (the vehicle outside on the horizontal direction side) of the shins L of the driver D. In this embodiment, the shin protection part 49 is allowed by a communicating part 55 (to be discussed later) to communicate with the main body inflation part 42, whereby it can receive inflation gas G through the main body inflation part 42. Also, the shin protection part 49, in the flat developed state of the bag main body 41, as shown in FIG. 6, projects rightward from the right edge of the lower end side portion (the portion constituted of the mounting part 43 and the lower end 47b of the lower limb protection part 47) of the bag main body 41. That is, in the air bag 40 of this embodiment, the shin protection part 49 is connected rightward from the lower end 47b of the lower limb protection part 47 for protecting the shins L. Specifically, in this embodiment, it is formed such that its lower end is connected to the lower end 42b (the lower end of the mounting part 43) of the main body inflation part 42. Also, in the inflation completed time of the bag main body 41, it is bent relative to the main inflation part 42 and, with its tip end 49a (right end in the flat developed state) facing backward, it projects backward from the main body inflation part 42 to cover the outside (right side) of the right shin Lr of the driver D seated in the driver seat (see FIG. 15). The width dimensions of the vertical side and horizontal side (the horizontal side in the flat developed state) thereof in the inflation completed time are set for the dimensions capable of covering the right side of the right shin Lr of the driver D, thereby, in the oblique collision and offset collision of the vehicle, enabling proper protection of the right shin Lr (see FIGS. 15 and 16) of an occupant seated in the driver seat, that is, the driver D, moving rightward obliquely forward.

Figure 8:
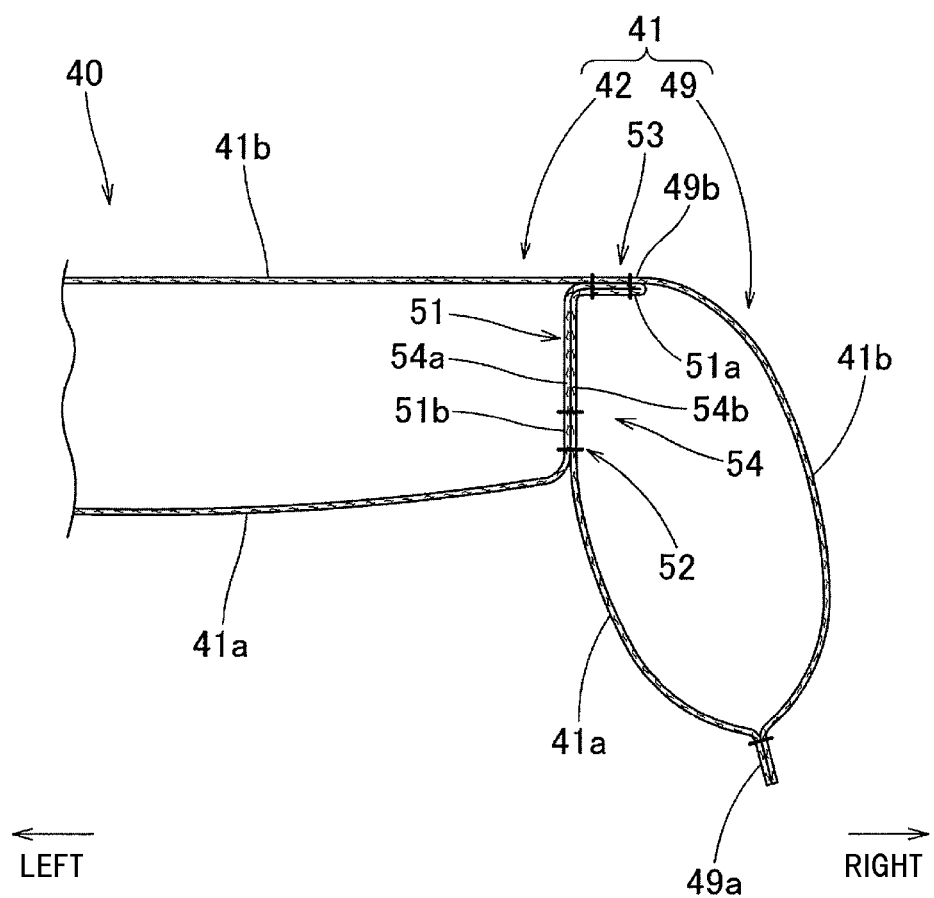
FIG. 8 is a schematic section view of the air bag of FIG. 5 taken along the VIII-VIII arrow of FIG. 5, showing a state where it is expanded as a single part.
Figure 12:
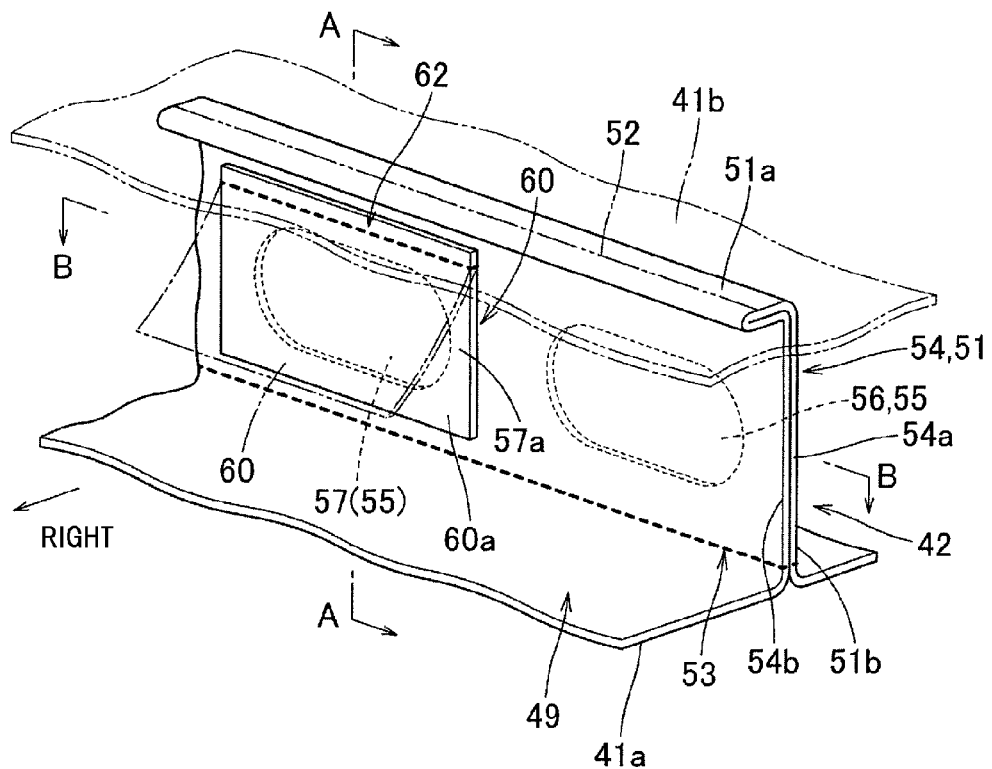
FIG. 12 is a schematic partially enlarged perspective view and a section view of the air bag of FIG. 5, showing the position of the partition wall portion.
Figure 12:
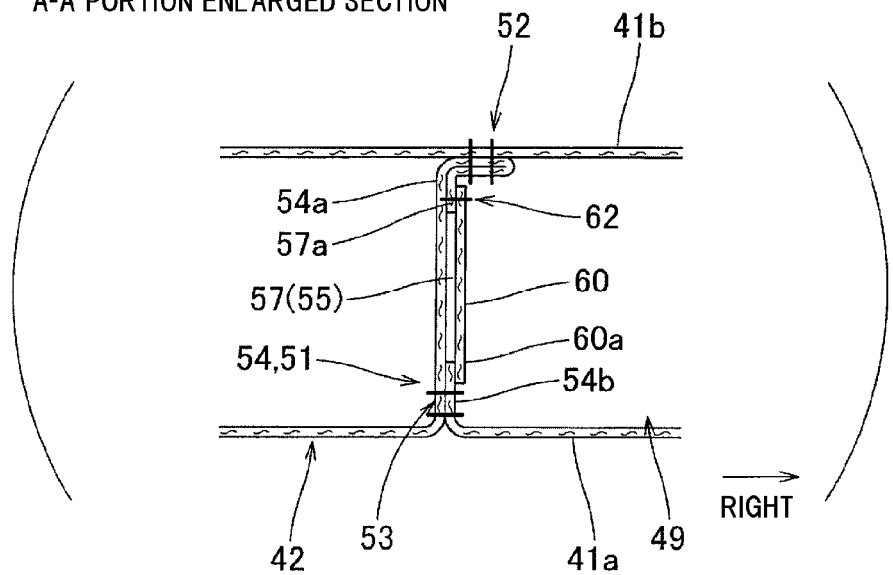
Figure 13:
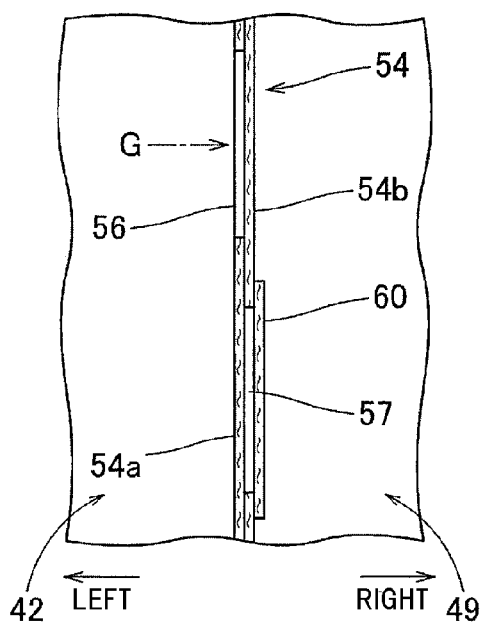
FIG. 13 is a schematic section view of the air bag of FIG. 5, explaining the operation of a communication portion when it is expanded.
Figure 13:
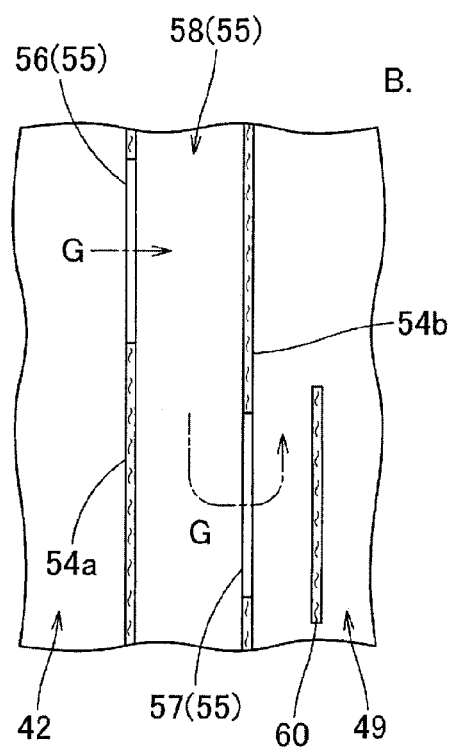
Figure 13:
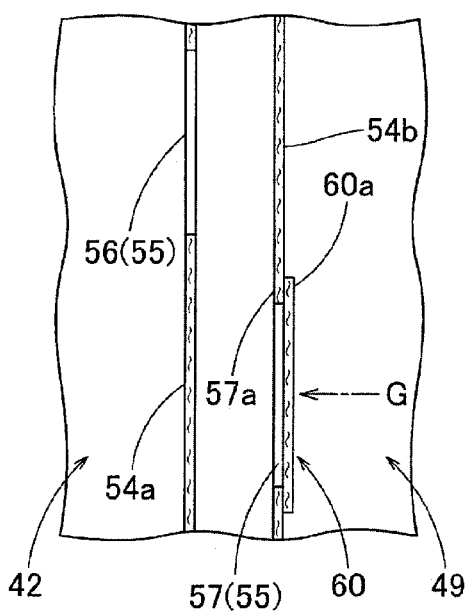

The bag main body 41 of this embodiment also includes a partition wall part 54 for dividing the shin protection part 49 and main body inflation part 42 (see FIG. 8), while the partition wall part 54, as shown in FIGS. 12 and 13, has a communication portion 55 enabling communication between the shin protection part 49 and main body inflation part 42.

Figure 10:
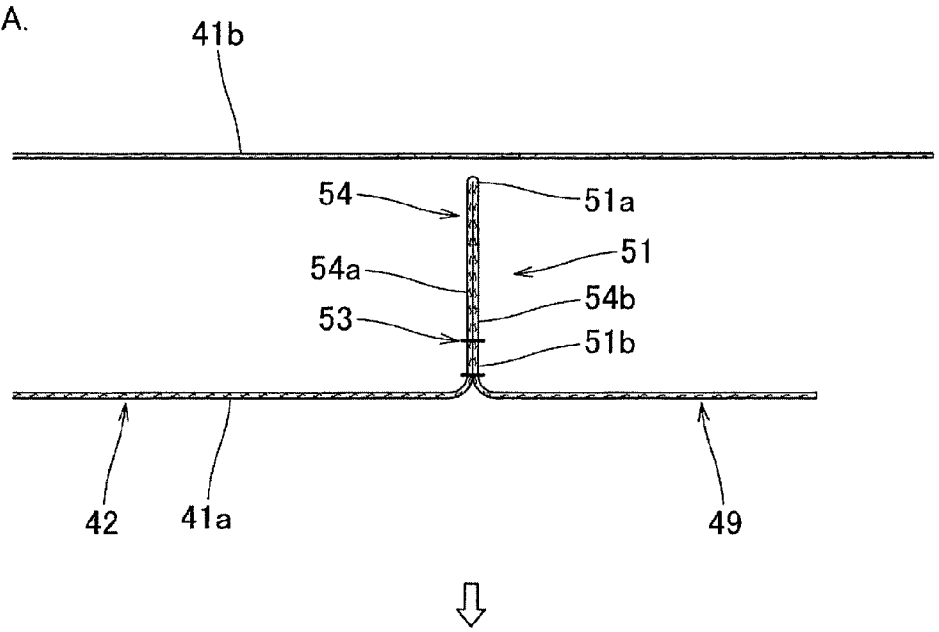
FIG. 10 is a schematic section view of the air bag of FIG. 5, explaining the procedure for forming a partition wall portion.
Figure 10:
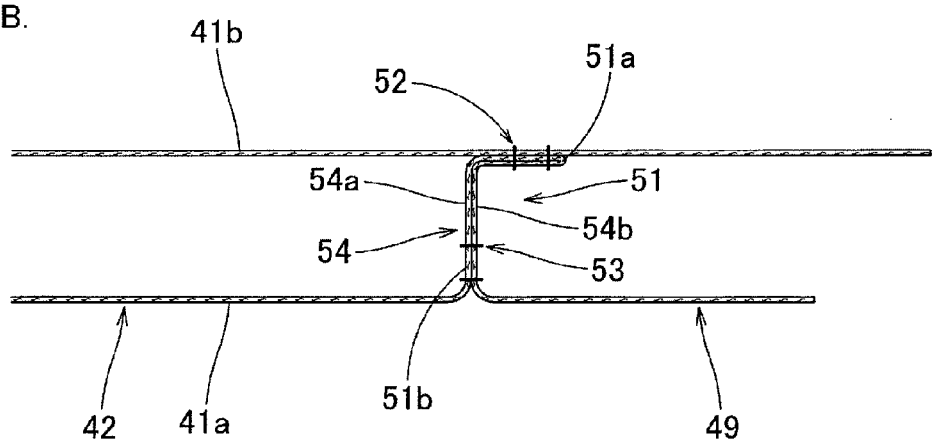

In the bag main body 41 of this embodiment, in the front wall portion 41a, an area ranging from a portion constituting the rear left side of the shin protection part 49 in the inflation completed time to a portion constituting the main body inflation part 42 is pinched to project inwardly of the bag main body 41 while reducing the horizontal side width dimension, thereby forming a tack portion 51 in the boundary portion between the shin protection part 49 and main body inflation part 42. As shown in Sections A and B of FIG. 10, the base 51b side portion of the tack portion 51 is sewn (connected) using a sewing thread, whereas the tip end 51a side portion thereof is sewn using a sewing thread to the back wall portion 41b with the tip end 51a facing outward in the horizontal direction. In the air bag 40 of this embodiment, the tack portion 51 constitutes the partition wall part 54. That is, the partition part 54, with the front wall portion 41a formed as a two-superposed portion, includes an outside portion 54b to be disposed on the shin protection part 49 side in the inflation completed time of the bag main body 41, and an inside portion 54a to be disposed on the main body inflation part 42 side. A connecting portion 53 having sewn the base 51b side of the tack portion 51 and a connecting portion 52 connecting the tip end 51a side of the tack portion 51 to the back wall portion 41b, as shown by two-dot chain lines in FIG. 6, are respectively formed to have a linear shape substantially along the longitudinal direction; and, the length dimension thereof is set substantially equal to the longitudinal-direction side width dimension of the shin protection part 49 in the flat developed state. That is, the tack portion 51 (partition wall part 54) divides the shin protection part 49 and main body inflation part 42, while closing substantially the whole area of the left end side of the shin protection part 49.

In the air bag 40 of this embodiment, the connecting portion 52 for connecting the tip end 51a side (front wall portion 41a) of the tack portion 51 to the back wall portion 41b is used as a starting point when, in the inflation completed time, the shin protection part 49 is bent relative to the main body inflation part 42. The front wall portions 41a are connected to each other with the connecting portion 52 between them by the connecting portions 53 having connected the base 51b side of the tack portion 51. In the bag main body 41 of this embodiment, in the front wall portion 41a when it is developed alone prior to formation of the connecting portion 53, the distance between connecting portion formation expected portions 68, 68 for forming the connecting portions 53 (the pinching amount of the front wall portion 41a by the tack portion 51) L1 (see Section B of FIG. 9) is set for a dimension which, in the inflation completed time of the bag main body 41, can project the shin protection part 49 greatly backward from the main body inflation part 42 with the connecting portion 52 as a starting point while maintaining its bent state relative to the main body inflation part 42, and also which, when receiving the right shin Lr of the driver D moving rightward obliquely forward, can prevent the shin protection part 49 from opening greatly relative to the main body inflation part 42 with the tip end 49a side facing horizontally outward (rightward). Also, in the bag main body 41 of this embodiment, in the back wall portion 41b flat developed alone prior to formation of the connecting portion 52, a connecting portion formation expected portion 69 for forming the connecting portion 52, as shown in Section A of FIG. 9, is formed between the connecting portion formation expected portions 68, 68 formed in the front wall portion 41a. Here, in Section A of FIG. 9, for convenience of explanation, the connecting portion formation expected portions 68, 68 are also shown by two-dot chain lines; however, actually, in the back wall portion 41b, the connecting portion formation expected portions 68, 68 are not formed.

Figure 11:
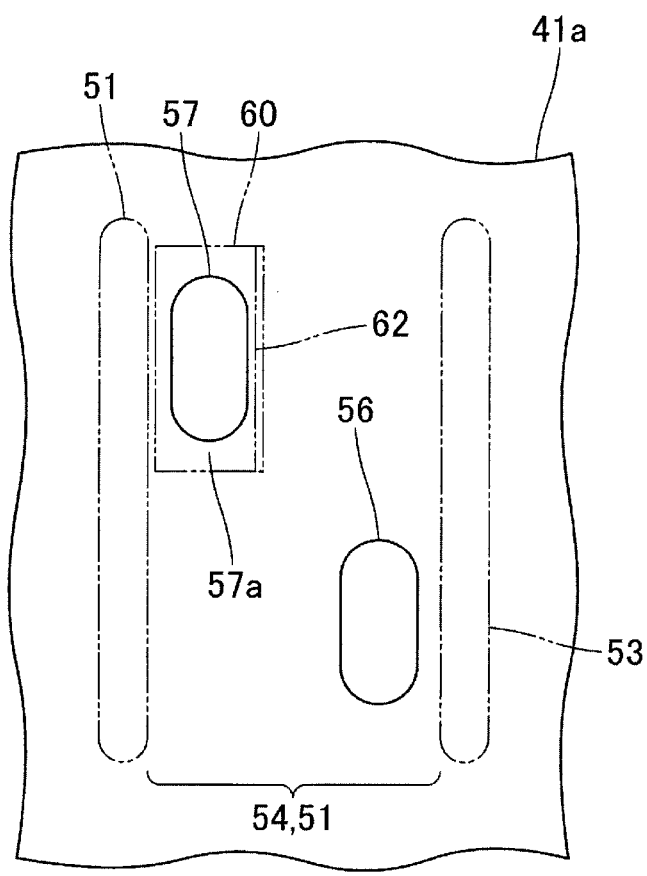
FIG. 11 is a partially enlarged plan view of the front wall portion of the air bag of FIG. 5, showing the partition wall portion forming portion, while a flap valve for closing a second insertion hole is arranged.
Figure 11:
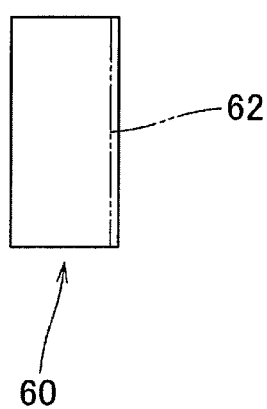

A communication portion 55 formed in the partition wall portion 54 (tack portion 51), as shown in FIGS. 11 to 13, includes first and second communication holes 56 and 57 respectively formed in the inside and outside portions 54a and 54b, and a communication passage 58 constituted of a clearance between the outside and inside portions 54b and 54a. The first and second communication holes 56 and 57 are formed apiece in the outside and inside portions 54b and 54a while they are spaced from each other in the longitudinal direction. Specifically, the first communication hole 56 to be formed in the inside portion 54a serving as the main body inflation part 42 side (upstream side of the inflation gas G) is situated on the front end side of the inside portion 54a serving as the lateral side of the area of the mounting part 43, while the second communication hole 57 to be formed in the outside portion 54b serving as the shin protection part 49 side (downstream side of inflation gas G) is situated on the rear end side of the outside portion 54b. The first and second communication holes 56 and 57 are formed such that their respective opening areas are not overlapped with each other in the horizontal direction when viewed from right in the inflation completed time of the air bag 40 (see FIG. 12 and Section A of FIG. 13). The communication passage 58 is formed when the inside and outside portions 54a and 54b are separated from each other by the inflation gas G supplied from the first communication hole 56 in the inflating time of the main body inflation part 42 (see Section B of FIG. 13), while the inflation gas G supplied into the communication passage 58 from the first communication hole 56 flows through the second communication hole 57 into the shin protection part 49.

The air bag 40 of this embodiment, as shown in FIGS. 12 and 13, further includes a flap valve 60 provided in the peripheral edge 57a of the second communication hole 57 and serving as a check valve for preventing the inflation gas G flown into the shin protection part 49 from flowing out from the second communication hole 57. The flap valve 60 is formed of a flexible sheet member (in this embodiment, the same base fabric as that of the air bag 40), has a substantially rectangular shape capable of closing the second communication hole 57 (see FIG. 11) and is disposed to cover the second communication hole 57 from the shin protection part 49 side, while its one side is sewn (connected) to the peripheral edge 57a of the second communication hole 57. When supplying the inflation gas G from the main body inflation part 42 into the shin protection part 49 through the first communication hole 56 and communication passage 58, the flap valve 60 is pressed and opened by the inflation gas G to open the second communication hole 57 (see two-dot chain lines in FIG. 12, and FIG. 13) and, after the inflation gas G is supplied and the shin protection part 49 completes inflation, substantially the whole periphery of the outer peripheral edge 60a side portion thereof is pressed toward the peripheral edge 57a side of the second communication hole 57 by the internal pressure of the inflation gas G filled in the shin protection part 49, thereby maintaining the closed state of the second communication hole 57 and thus preventing the inflation gas G from flowing out from the second communication hole 57 (see Section C of FIG. 13). And, in the bag main body 41 of this embodiment, since the inflation gas G flown into the shin protection part 49 is prevented by the flag valve 60 from flowing out toward the main body inflation part 42, the shin protection part 49 is enabled to complete inflation with a higher internal pressure than the main body inflation part 42.

Figure 7:
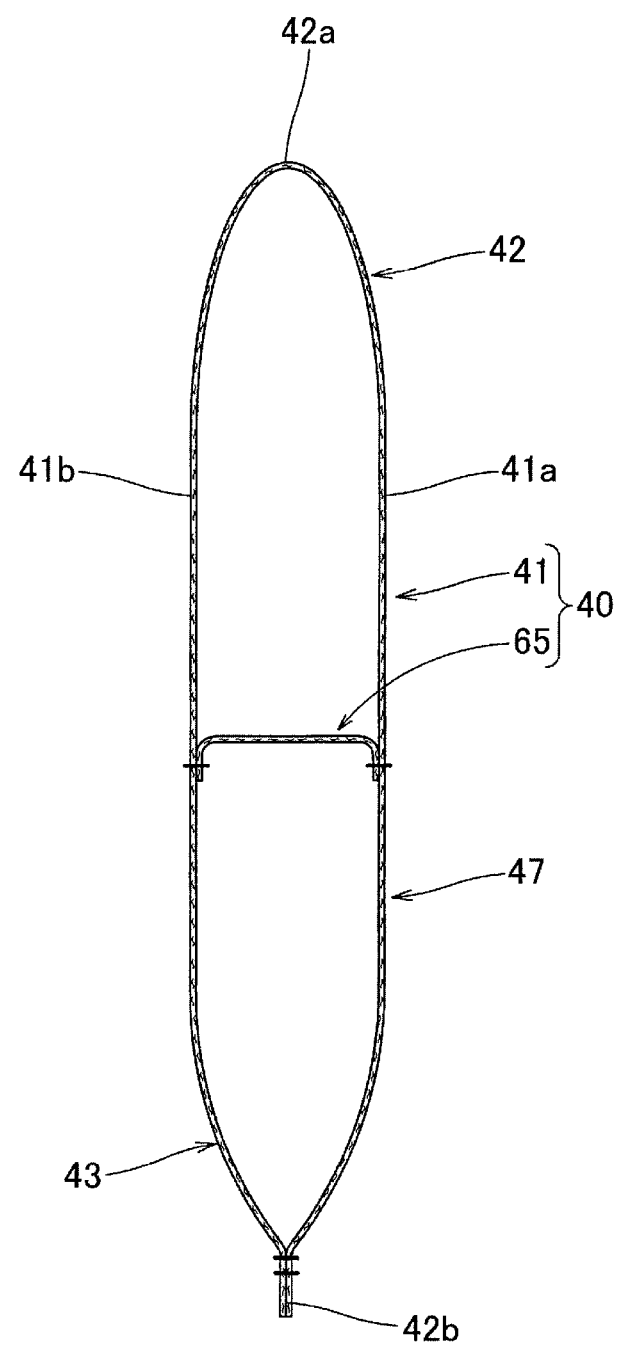
FIG. 7 is a schematic section view of the air bag of FIG. 5 taken along the VII-VII arrow of FIG. 5, showing a state where it is expanded as a single part.

The internal tether 65 within the bag main body 41 is used to restrict the thickness in the inflation completed time. The internal tether 65 is disposed to extend substantially along the horizontal direction in such portion (see FIG. 14) of the lower limb protection part 47 of the main body inflation part 42 of the bag main body 41 as covers the front of the shins L in the inflation completed time. The internal tether 65 is formed of a flexible belt-shaped sheet member and, as shown in FIG. 7, connects together the front and back wall portions 41a and 41b and, in the inflation completed state, restricts the distance between them to thereby prevent the shin L protection area from inflating excessively thick.

The front and back wall portions 41a and 41b of the bag main body 41, flap valve 60 and internal tether 65, in this embodiment, are formed of woven fabric constituted of flexible polyester threads, polyamide threads or the like. The front and back wall portions 41a and 41b are formed of coat cloth coated with silicon-made coating agent for gas leakage prevention.

Next, description is given of a method for mounting the air bag apparatus S of this embodiment onto a vehicle. Firstly, while projecting the bolts 36 from the insertion holes 44, the retainer 34 is mounted from the open slit 45 into the air bag 40. The air bag 40 is folded in a state that it can be mounted into the case 21 and, in order to prevent the folded state from collapsing, the periphery of the folded air bag 40 is wrapped in a breakable wrapping sheet (not shown). Next, the inflator main body 28 is inserted through the open slit 45 into the hold part 35 of the retainer 34 within the air bag 40. Then, with the bolts 36 projected from the bottom wall 22, the folded air bag 40 and inflator 27 are mounted into the case 21 and the nuts 37 are fastened to the bolts 36 projected from the bottom wall 22, thereby mounting the air bag 40 and inflator 27 onto the case 21. After then, the air bag cover 15 is assembled to the case 21, thereby enabling production of an air bag assembly. And, the air bag assembly is mounted and fixed to the body 1 using the brackets 4, 5 and 6, and a connector 31 with the lead wire 32 extending from an air bag operation circuit connected thereto is connected to the inflator 27. And, the instrument panel 13 and an undercover (not shown) are mounted, thereby enabling mounting of the air bag apparatus S into the vehicle.

After the air bag apparatus S is mounted into the vehicle, in the front collision, oblique collision or offset collision of the vehicle, when an operation signal is input to the inflator 27, the inflation gas G is discharged from the gas discharge ports 30a of the inflator 27 into the air bag 40. And, the air bag 40, while letting the inflation gas G flow in, inflates to break the wrapping sheet (not shown) and press against the door parts 16 of the air bag cover 15, whereby the door parts 16 break the breakage expected part 17 in the periphery and opens vertically with the hinge part 18 as the center of rotation. And, the air bag 40 projects from the opening 21a of the case 21 backwardly of the vehicle and completes inflation as shown by two-dot chain lines in FIGS. 1 and 4 and in FIGS. 14 and 15.

Figure 16:
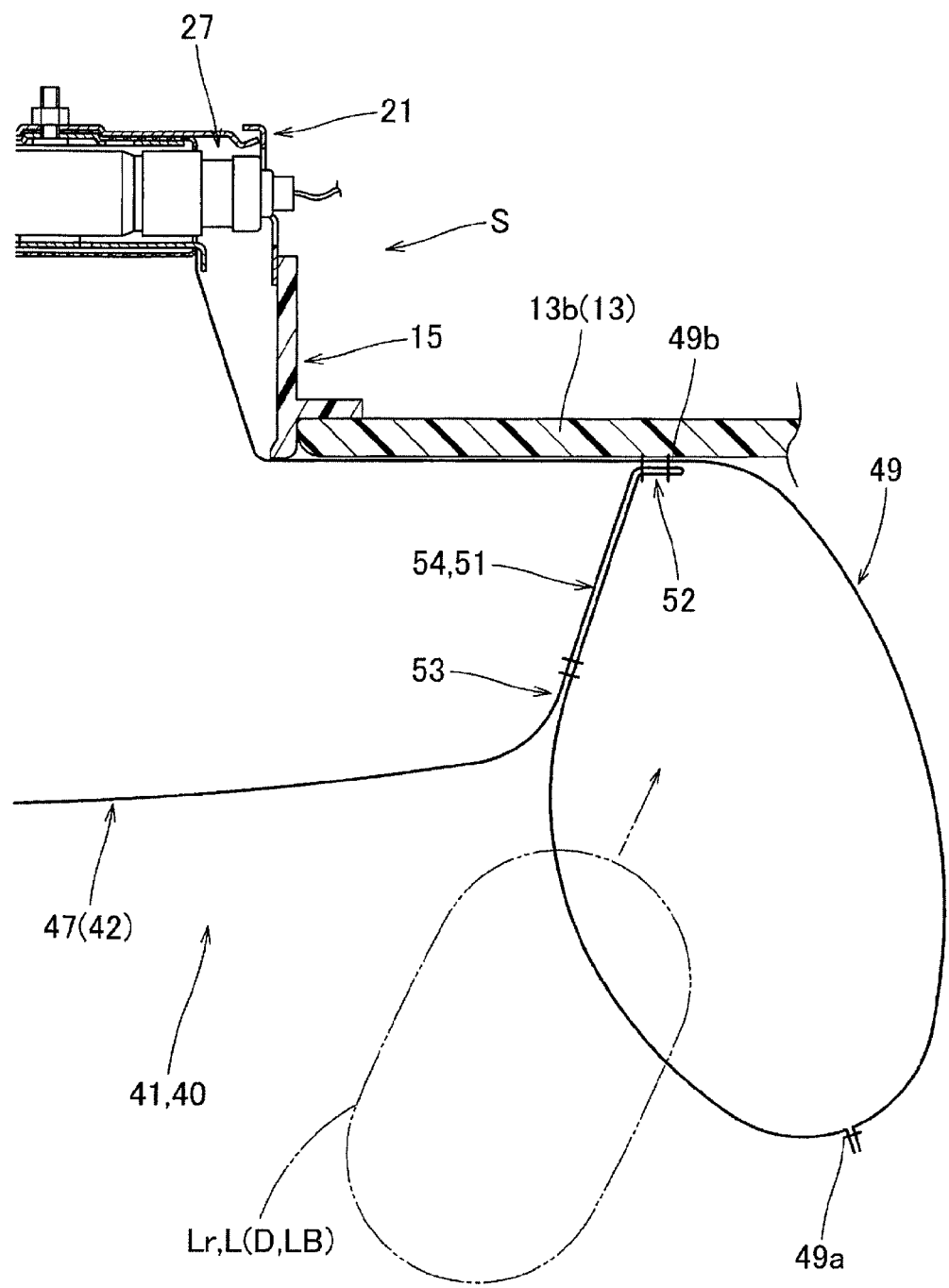
FIG. 16 is a schematically partially enlarged section view of the lower limb protecting air bag apparatus using an air bag according to the embodiment, showing a state where the shin protection part of the inflation completed air bag receives the shins of an occupant moving obliquely forward.

With the air bag 40 of the air bag apparatus S of this embodiment, the shin protection part 49, in the inflation completed time, projectable backward from the main body inflation part 42 for covering the lateral side (right side) of the shins L (right shin Lr) of the driver D serving as an occupant is capable of completing its inflation with a higher internal pressure than that of the main body inflation part 42. Therefore, in the vehicle oblique collision or offset collision, when the air bag 40 receives the shins L (right shin Lr) of the driver moving rightward obliquely forward, it can receive the right shin Lr in a properly stiff state. Specifically, the right shin Lr of the driver D can be received by the shin protection part 49 while the tip end 49a projecting from the main body inflation part 42 is prevented from bending outward in the horizontal direction, thereby enabling prevention of slip-off of the right shin Lr moving rightward obliquely forward; that is, the shin protection part 49 can receive the right shin Lr properly. With the air bag 40 of this embodiment, specifically, in the inflation completed time of the bag main body 41, the forwardly situated base 49b side portion of the shin protection part 49 is supported by the lower panel 13b of the instrument panel 13 (see FIG. 16). Also, in the bag main body 41, the main body inflation part 42 and shin protection part 49 are separated by the tack portion 51 formed by pinching the front wall portion 41a while reducing the width dimension on the horizontal side thereof; and, the shin protection part 49 is connected to the main body inflation part 42, while maintaining its bent state relative to the main body inflation part 42, by the two portions spaced in the longitudinal direction in the inflation completed time, that is, the connecting portions 53 connecting the base 51b side of the tack portion 51 and the connecting portion 52 connecting the tip end 51a side of the tack portion 51 to the back wall portion 41b. Therefore, in the air bag 40 of this embodiment, as shown in FIG. 16, when receiving the right shin Lr of the driver D moving rightward obliquely forward, the shin protection part 49 receives the right shin Lr of the driver D while, with the 49b side thereof supported by the lower panel 13b, it is prevented by the two connecting portions 52 and 53 spaced in the longitudinal direction against the rotary movement thereof in which the tip end 49a side faces outward (rightward) in the horizontal direction and the part 49 opens relative to the main body inflation part 42 with the base 49b side as a starting point. This can prevent the shin protection part 49 from moving following the movement of the right shin Lr, thereby enabling the shin protection part 49 inflated with a high internal pressure to properly restrict the right shin Lr of the driver.

Thus, the air bag 40 of this embodiment can properly protect the shins L of the driver D moving rightward obliquely forward.

In the air bag 40 of this embodiment, since the shin protection part 49, in the inflation completed time of the air bag main body 41, is arranged to cover the horizontal-direction outside, namely, right side of the shins L of the driver D, the shins L of the driver D moving rightward obliquely forward can be prevented from interfering with a door trim.

Specifically, the air bag 40 of this embodiment supplies the inflation gas G therein through the main body inflation part 42 and includes, in the communication portion 55 enabling the shin protection part 49 and main body inflation part 42 to communicate with each other, the flap valve 60 serving as a check valve to prevent the inflation gas G supplied into the shin protection part 49 from flowing out toward the main body inflation part 42. Thus, even in a structure that the inflation gas G is supplied into the shin protection part 49 through the main body inflation part 42, the inflation gas G once supplied into the shin protection part 49 can be prevented from returning into the main body inflation part 42, thereby enabling positive maintaining of the high internal pressure state of the shin protection part 49 in the inflation completed time. Here, in this embodiment, the shin protection part is structured to supply the inflation gas therein through the main body inflation part. However, so long as inflation can be completed with an internal pressure higher than that of the main body inflation part, it may also be structured such that the inflation gas discharged from the inflator is supplied directly into the shin protection part. Also, in this embodiment, the flap valve 60 is sewn to the peripheral edge 57a of the second communication hole 57 only by the connecting portion 62 formed on one side. However, the flap valve 60 may also be sewn to the peripheral edge of the second communication hole by two connecting portions formed on two opposed sides.

Here, in the air bag 40 of this embodiment, the shin protection part 49 is arranged only on the right side (only on the outside in the horizontal direction) of the main body inflation part 42. However, this is not limitative but it may also be arranged only on the inside in the horizontal direction of the main body inflation part or may be arranged on both right and left sides of the main body inflation part.

Although this embodiment has been described by way of an air bag used in a lower limb protecting air bag apparatus to be arranged in front of a driver seat, the air bag of the invention, of course, can also apply to a lower limb protecting air bag apparatus to be arranged in front of an assistant driver seat and a lower limb protecting air bag to be arranged in front of a rear seat.

What is claimed is:

1. A lower limb protecting air bag, folded stored in front of an occupant seated in a seat and inflatable to cover the front of the lower limbs of the occupant by inflation gas supplied therein, comprising:
    a main body inflation part configured to cover the front of the lower limbs of the occupant when inflation is completed; and
    a shin protection part arranged at least on one end side of the main body inflation part in the horizontal direction and projectable backward from the main body inflation part for covering the lateral side of the shins of the occupant in the inflation completed time, wherein
    the shin protection part completes inflation with an internal pressure higher than that of the main body inflation part.

2. A lower limb protecting air bag according to claim 1, wherein:
    the shin protection part communicates with the main body inflation part and inflation gas is supplied therein through the main body inflation part; and
    a check valve, configured to prevent the inflation gas supplied into the shin protection part from flowing out toward the main body inflation part, is provided in a communication part enabling communication between the shin protection part and the main body inflation part.

* * * * *